Patented Mar. 16, 1948

2,437,833

UNITED STATES PATENT OFFICE 2,437,833

N-BENZYL-N-MYRISTYL MORPHOLINIUM HALIDES

Joseph B. Niederl, Brooklyn, and Victor Niederl, Round Top, N. Y., and Martin E. McGreal, Somersworth, N. H.

No Drawing. Application June 29, 1946, Serial No. 680,522

4 Claims. (Cl. 260—247)

This invention relates to N-benzyl-N-alkyl morpholinium compounds and particularly to such N-benzyl-N-alkyl morpholinium compounds having from 12 to 18 carbon atoms in the alkyl radical. More specifically, the invention relates to potent bactericidal agents, such as N-benzyl-N-myristyl morpholinium chloride.

This application is a continuation in part of application Serial No. 393,672, filed May 15, 1941, now abandoned and application Serial No. 471,024, filed January 1, 1943 which issued into Patent No. 2,406,892 on September 3, 1946.

The N-benzyl-N-alkyl morpholinium compounds of this invention may be prepared by several methods. Most conveniently when preparing N-benzyl-N-alkyl morpholinium halides, the N-alkylated morpholine is treated with a benzyl halide. Generally speaking, the reaction may be carried to completion at room or at elevated temperatures and in the presence or in the absence of an inert solvent. Thus, any of the lower molecular N-alkylated morpholines, such as N-methyl, N-ethyl, N-propyl, N-butyl, or N-amyl morpholine; or any of the higher molecular alkylated morpholines, such as N-lauryl, N-myristyl, N-cetyl or N-octadecyl morpholine, described in patent application Serial No. 435,638, filed March 21, 1942, now abandoned, may be subjected to the action of benzyl chloride or benzyl bromide to yield the respective N-benzyl-N-alkyl morpholinium halides.

In another method for preparing the N-benzyl-N-alkyl morpholinium halides, N-benzyl morpholine having a boiling point of 260° to 261° C. is reacted with a lower molecular or higher molecular alkyl halide, such as ethyl, methyl, n-propyl, n-butyl, and n-amyl iodides or lauryl, myristyl, cetyl, and octadecyl bromides or iodides and the like.

Among the N-benzyl-N-alkyl morpholinium halides prepared in accordance with the previously discussed processes are:

N-benzyl-N-methyl morpholinium halides
N-benzyl-N-ethyl morpholinium halides
N-benzyl-N-n-propyl morpholinium halides
N-benzyl-N-n-butyl morpholinium halides
N-benzyl-N-n-amyl morpholinium halides
N-benzyl-N-n-hexyl morpholinium halides
N-benzyl-N-n-octyl morpholinium halides
N-benzyl-N-lauryl morpholinium halides
N-benzyl-N-myristyl morpholinium halides
N-benzyl-N-cetyl morpholinium halides
N-benzyl-N-octadecyl morpholinium halides
N-benzyl-N-phenyl morpholinium halides While it is not necessary to use solvents in carrying out the reactions of this invention, solvents or diluents may be used, including esters, such as ethyl acetate; hydrocarbons, such as benzene, toluene, petroleum ether, and the like; alcohols, such as ethyl and methyl alcohol; ethers, such as diethyl and diisopropyl ethers; and like inert solvents. In a special embodiment of the invention, the reaction is carried out in the presence of a solvent which dissolves the reactants but precipitates out the reaction products, especially if the solvent is cool. When operating in this manner, the N-benzyl-N-alkyl morpholinium salts may be separated out in a purified form without the necessity of removing the solvent. Various solvents may serve this dual purpose as a homogenizing and a crystallizing medium. For practical reasons, ethyl acetate seems to be the most appropriate solvent of this type. It should be understood, therefore, that claims directed to reactions taking place in the presence of ethyl acetate encompass such equivalents.

In accordance with one embodiment of the invention, temperatures are regulated in such a manner that the reactants are retained in a liquid phase during the reaction. Generally speaking, water or steam baths provide sufficiently high temperatures for such a purpose.

When the reactants are mixed together without diluents or solvents, suitable concentrated aqueous solutions of the reaction product may be formed merely by the addition of water without the necessity of expensive separatory, crystallizing or purifying steps.

The following examples disclose illustrative embodiments of the invention but are not to be considered a limitation upon it.

*Example I.—N-benzyl-N-alkyl morpholinium chlorides*

One mole, 283 grams, of N-myristyl morpholine having a M. P. of 20° C. and a B. P. of 175–178° C. at 4 mm. pressure, is placed in a one liter round-bottomed flask and 126 grams of freshly distilled benzyl chloride are added. The flask is sealed tightly with a rubber stopper, placed in a steam bath and heated for 12 hours at 100° C. with occasional agitation. After the reaction mixture is cooled, a light colored solid is obtained. The material is further purified by recrystallization from hot ethyl acetate.

Similarly, one-tenth mole of freshly distilled N-myristyl morpholine and one-tenth mole of freshly distilled benzyl chloride may be reacted in an appropriate tube having a capacity of 50 to 60 cc. After the introduction of the reactants into the tube, they are thoroughly mixed and the tube is sealed and placed in a boiling water bath. After 4 hours, the contents of the tube will solidify upon cooling. After 12 hours, the reaction is completed and the reaction product is soluble in water in all proportions. In order to crystallize out the N-benzyl-N-myristyl morpholinium chloride, the contents of the tube are transferred to a flask, such as a 250 cc. Erlenmeyer flask, and boiled with 100 cc. of ethyl acetate. The boiling is continued until the entire contents of the tube are dissolved. Then the resulting solution is allowed to stand at room temperature for one hour, whereupon most of the N-benzyl-N-myristyl morpholinium chloride crystallizes out. The crystals are filtered off and the mother liquor is concentrated to yield additional crystals of the quaternary ammonium salt.

The N-benzyl-N-myristyl morpholinium chloride produced as described hereinbefore begins to sinter at about 100° C. and is completely melted at 135° C.

In a similar manner by using appropriate N-alkyl morpholines, the following N-benzyl-N-alkyl morpholinium chlorides are produced:

|  | M. P., °C. |
|---|---|
| N-benzyl-N-methyl morpholinium chloride | 229 |
| N-benzyl-N-ethyl morpholinium chloride | 150 |
| N-benzyl-N-lauryl morpholinium chloride | 120 |
| N-benzyl-N-cetyl morpholinium chloride | 150 |
| N-benzyl-N-octadecyl morpholinium chloride | 165 |

The previously described processes for producing N-benzyl-N-alkyl morpholinium chlorides are generally applicable. Normally, one mole of freshly distilled N-alkyl morpholine is placed in a suitable reaction vessel which can be sealed or otherwise closed, such as in an autoclave, or introduced into a reaction vessel provided with a reflux condenser having a drying tube attached to ensure thoroughly anhydrous conditions. Thereafter, one mole of freshly distilled benzyl chloride is added. The two reactants are mixed thoroughly and the reaction vessel closed. Then the reaction mixture preferably is heated to about 100° C. and the heating continued until the reaction mixture becomes solid on cooling and until it becomes completely soluble in water. This reaction usually requires from 4 to 12 hours.

After the reaction is completed, further working up of the reaction product depends upon whether the product is to be used as a crystalline solid or in concentrated aqueous solutions. When the crystallized product is desired, it is either crystallized out of the reaction mixture or is precipitated out by the addition of a suitable diluent, such as ethyl acetate, diethyl ether, petroleum ether, benzene, toluene, or the like. Preferably, the N-benzyl-N-alkyl morpholinium chloride is then recrystallized from hot ethyl acetate.

When aqueous solutions are desired, the reaction mixture is merely distilled with an appropriate amount of water to yield, for example, concentrations of 50 per cent, 30 per cent or 20 per cent. The reaction mass may be pretreated with suitable adsorbents or subjected to filtration, to increase its purity, before being diluted with the water.

*Example II.—N-benzyl-N-alkyl morpholinium bromides*

One mole of freshly distilled N-alkyl morpholine is diluted with about 2 parts per volume of ethyl acetate and introduced into a suitable glass vessel. Thereafter, one mole of freshly distilled benzyl bromide is introduced into the reaction vessel. The reaction mass is thoroughly shaken and allowed to stand at room temperature. After about 12 hours, a nearly quantitative yield of the reaction product, N-benzyl-N-alkyl morpholinium bromide, is obtained. Thereupon, the crystals are filtered off and recrystallized from ethyl acetate. The mother liquor, upon concentration under reduced pressure, yields additional crystals of N-benzyl-N-alkyl morpholinium bromides.

For example, one-tenth mole, 28 grams, of N-myristyl morpholine is diluted with 50 ml. of ethyl acetate and introduced into a 250 ml. Erlenmeyer flask. Thereupon, one-tenth mole, 17 grams, of freshly distilled benzyl bromide is slowly introduced into the flask. After the completion of the addition of the benzyl bromide, the mixture is thoroughly shaken, closed with a stopper and set aside at room temperature for at least 12 hours. At the end of this period of time, most of the N-benzyl-N-myristyl bromide has crystallized out. The crystals then may be filtered off and recrystallized from hot ethyl acetate. If the mother liquor is concentrated under reduced pressure, additional crystals of the N-benzyl-N-myristyl morpholinium bromide will form. This operation may be repeated until all the quaternary morpholinium salt is isolated.

The N-benzyl-N-myristyl morpholinium bromide begins to sinter at about 80° C. and is completely melted at about 117° C.

In a similar manner, the following N-benzyl-N-alkyl morpholinium bromides have been prepared by reacting appropriate N-alkyl morpholines with benzyl bromide.

|  | M. P., °C. |
|---|---|
| N-benzyl-N-methyl morpholinium bromide | 251 |
| N-benzyl-N-ethyl morpholinium bromide | 175 |
| N-benzyl-N-lauryl morpholinium bromide | 102 |
| N-benzyl-N-cetyl morpholinium bromide | 130 |
| N-benzyl-N-octadecyl morpholinium bromide | 145 |
| N-benzyl-N-phenyl morpholinium bromide | 146 |

By following the techniques of the two preceding examples, or still better by treating benzyl morpholine with myristyl iodide, N-benzyl-N-myristyl morpholinium iodide having a melting point of 165 to 172° C. can be produced.

The previous examples disclose reactions involving molar ratios. An excess of either of the reagents may be present, however, without deleteriously affecting the results, since the reactions will take place in equimolar proportions.

The N-benzyl-N-alkyl morpholinium halides prepared as previously described may be used for the preparation of other N-benzyl-N-alkyl morpholinium salts. For instance, N-benzyl-N-alkyl morpholinium sulfates, including the alkyl sulfates, such as metho- and ethosulfates, or nitrates and the like, are obtained by treating the halides with silver, sodium or potassium salts of the appropriate mineral or organic acids or mono esters. Thus, the sulfates and nitrates are prepared by treating the chlorides or bromides, respectively, with silver sulfate or silver nitrate. The alkyl sulfates are best prepared by refluxing a halide with sodium or potassium salts of the respective mono alkyl sulfates, such as sodium methosulfate or potassium ethosulfate, and the like, dissolved in an alcoholic solution. Compounds produced in this manner include N-benzyl-N-alkyl morpholinium salts having from 12 to 18 carbon atoms in the alkyl radical, such as N-benzyl-N-myristyl morpholinium nitrate, N-benzyl-N-myristyl morpholinium sulfate, N-benzyl-N-myristyl morpholinium ethosulfate, N-benzyl-N-myristyl morpholinium methosulfate, and the like.

The prior art has taught that the maximum bactericidal properties of quaternary ammonium salts are obtained when such compounds contain an alkyl substituent of 16 carbon atoms. We have discovered that compounds of the type disclosed in this application, particularly the mineral acid salts thereof and especially the halides, have their optimum potency when the compounds contain 14 carbon atoms. For example, N-myristyl-N-benzyl morpholinium chloride when compared to N-cetyl-N-benzyl morpholinium chloride was found to have a phenol coefficient substantially greater than the last-mentioned compound, namely, a phenol coefficient of approximately 500 as compared to a phenol coefficient of approximately 50.

It will be understood that the embodiments of our invention described in the specification and illustrated by the examples are only illustrative of the compounds and the processes by which they are produced. Various modifications can be made without departing from the principles of the invention.

We claim:

1. A new class of compounds N-myristyl-N-benzyl morpholinium halides.
2. A new compound N-myristyl-N-benzyl morpholinium chloride.
3. A new compound N-myristyl-N-benzyl morpholinium bromide.
4. A new compound N-myristyl-N-benzyl morpholinium iodide.

JOSEPH B. NIEDERL.
VICTOR NIEDERL.
MARTIN E. McGREAL.

REFERENCES CITED

The following references are of record in the file of this patent:

UNITED STATES PATENTS

| Number | Name | Date |
| --- | --- | --- |
| 2,108,765 | Domagk | Feb. 15, 1938 |
| 2,127,103 | Bruson | Aug. 16, 1938 |
| 2,186,628 | Dickey | Jan. 9, 1940 |
| 2,229,024 | Bruson | Jan. 21, 1941 |
| 2,295,504 | Shelton | Sept. 8, 1942 |
| 2,317,999 | Leuchs | May 4, 1943 |